(12) United States Patent
Denmon

(10) Patent No.: US 12,582,114 B2
(45) Date of Patent: Mar. 24, 2026

(54) RECONFIGURABLE HEN TURKEY DECOYS

(71) Applicant: Huntwise, Inc., Monroe, LA (US)

(72) Inventor: Terry Denmon, Monroe, LA (US)

(73) Assignee: Huntwise, Inc., Monroe, LA (US)

( * ) Notice: Subject to any disclaimer, the term of this patent is extended or adjusted under 35 U.S.C. 154(b) by 22 days.

(21) Appl. No.: 18/415,120

(22) Filed: Jan. 17, 2024

(65) Prior Publication Data

US 2024/0237633 A1     Jul. 18, 2024

Related U.S. Application Data

(60) Provisional application No. 63/439,351, filed on Jan. 17, 2023.

(51) Int. Cl.
A01M 31/06          (2006.01)
(52) U.S. Cl.
CPC .................................. A01M 31/06 (2013.01)
(58) Field of Classification Search
CPC .................................................... A01M 31/06
See application file for complete search history.

(56) References Cited

U.S. PATENT DOCUMENTS

| | | | | |
|---|---|---|---|---|
| 2,662,327 A | * | 12/1953 | Petersen | A01M 31/06 43/3 |
| 2,885,813 A | * | 5/1959 | Kratzert | A01M 31/06 D22/125 |

| | | | | |
|---|---|---|---|---|
| 4,435,913 A | * | 3/1984 | Messina | A01M 31/06 43/3 |
| 4,965,953 A | * | 10/1990 | McKinney | A01M 31/06 43/2 |
| 5,036,614 A | * | 8/1991 | Jackson | A01M 31/06 43/3 |
| 5,274,942 A | * | 1/1994 | Lanius | A01M 31/06 43/2 |
| 5,375,363 A | * | 12/1994 | Higdon | A01M 31/06 43/3 |
| 8,230,638 B1 | * | 7/2012 | Dunaway | A01M 31/06 43/2 |
| 9,826,731 B2 | * | 11/2017 | Cagle | A01M 31/06 |
| 2007/0251135 A1 | * | 11/2007 | Watlov | A01M 31/06 43/3 |
| 2008/0029659 A1 | * | 2/2008 | Weber | A01M 31/06 248/156 |

(Continued)

*Primary Examiner* — Monica L Perry
*Assistant Examiner* — Brittany A Lowery
(74) *Attorney, Agent, or Firm* — Kean Miller LLP; Robert Devin Ricci; Taylor Dunne

(57)          ABSTRACT

A reconfigurable hen turkey decoy is disclosed comprising: a housing, where the housing includes plastic, where the housing has an outer surface, an inner surface, an interior space, and at least one opening, and where at least a portion of the outer surface resembles a hen turkey; a guide member, where the guide member includes an elastic material, where the guide member has an opening, and where the guide member is at least partially disposed over the opening of the at least one opening of the housing; and a support member, where the support member has a length and a radius, where the support member is removably positioned in the opening of the guide member, where the length of the support member and the length of the housing forms an angle, and where the support member and the housing can be releasably secured into at least two different angles.

13 Claims, 10 Drawing Sheets

(56) References Cited

U.S. PATENT DOCUMENTS

| 2009/0165353 A1* | 7/2009 | Priest | A01M 31/06 |
| | | | 43/2 |
| 2011/0232154 A1* | 9/2011 | Crank, Jr. | A01M 31/06 |
| | | | 43/3 |
| 2014/0338249 A1* | 11/2014 | Heiges | A01M 31/06 |
| | | | 43/3 |
| 2015/0059227 A1* | 3/2015 | Kubinec | A01M 31/06 |
| | | | 43/2 |
| 2020/0367486 A1* | 11/2020 | Butz | A01M 31/06 |

* cited by examiner

202

RECONFIGURABLE HEN TURKEY DECOYS

CROSS-REFERENCE TO RELATED APPLICATIONS

This application claims benefit of priority under 35 U.S.C. § 119 (e) of U.S. Ser. No. 63/439,351, filed Jan. 17, 2023, the entire contents of which is incorporated herein by reference in its entirety

BACKGROUND

Field

Described herein are hen turkey decoys that have multiple configurations of housings and support members, allowing the hen turkey decoys to be configured in an upright pose, a feeding pose, and a breeding pose.

Description of the Related Art

Hunting wild turkeys is a popular sport that is done mostly in the Spring during or around the breeding season for the wild turkey. Decoys are commonly used for this this type of hunting. To be effective, a decoy must resemble the animal. In theory, the more life-like a decoy will look, the more likely that the intended animal will be fooled by the decoy into behaving as intended.

Most hunting is for the mature male turkey, which are commonly referred to as Toms or Gobblers. A variety of decoys are used to lure these Toms to within shooting range of the hunter, the most popular being a decoy which represents a mature female turkey or hen. Prior to actual breeding, the mature Toms gather as many hens as they can and attempt to hold them in a group until each is bred, at which time the bred hen leaves the group to build a nest and lay her eggs. Toms are constantly looking for other unbred hens to add to the group. Turkeys behave differently during the various phases of the breeding cycle, varying from pre-breeding to breeding to post-breeding. Three of the most common poses are an upright pose, a feeding pose, and a breeding pose where the hen is laying on the ground. However, it can be challenging and inconvenient for a hunter to have decoys representing all three of these poses available during a hunt. In fact, the hunter often cannot tell which pose will work best until in the field and observing the action of the turkeys.

Consequently, there is a need for new hen turkey decoys that can be configured into different natural poses.

SUMMARY

Provided herein are reconfigurable hen turkey decoys that can be configured into multiple lockable positions providing an upright pose, a feeding pose, and a breeding pose. In a specific embodiment, a reconfigurable hen turkey decoy includes: a housing, where the housing includes blow molding plastic, where the housing has a length, a width, a height, an outer surface, an inner surface, an interior space, and at least one opening, and where at least a portion of the outer surface resembles a hen turkey; a guide member, where the guide member includes an elastic material, where the guide member has an opening, and where the guide member is at least partially disposed over the opening of the at least one opening of the housing; and a support member, where the support member has a length and a radius, where the support member is removably positioned in the opening of the guide member, where the length of the support member and the length of the housing forms an angle, and where the support member and the housing can be releasably secured into at least two different angles.

In another specific embodiment, a reconfigurable hen turkey decoy includes: a housing, where the housing component includes blow molded plastic, where the housing has an outer surface, an inner surface, and an interior space, where at least a portion of the outer surface resembles a hen turkey, and where the housing has an opening on a bottom side; a pivot plate, where the pivot plate includes injection molded plastic, and where the pivot plate is positioned in the interior space of the housing and coupled to the inner surface; a joint, where the joint is coupled to the pivot plate; and a support member, where the support member has a length and a radius, where the support member is removably positioned in the opening of the housing, where the length of the support member and the length of the housing forms an angle, and where the support member and the housing can be releasably secured into at least two different angles

BRIEF DESCRIPTION OF THE DRAWINGS

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art can utilize their teachings. Therefore, no limitation of the scope of the present disclosure is thereby intended.

DETAILED DESCRIPTION

Figure 1:
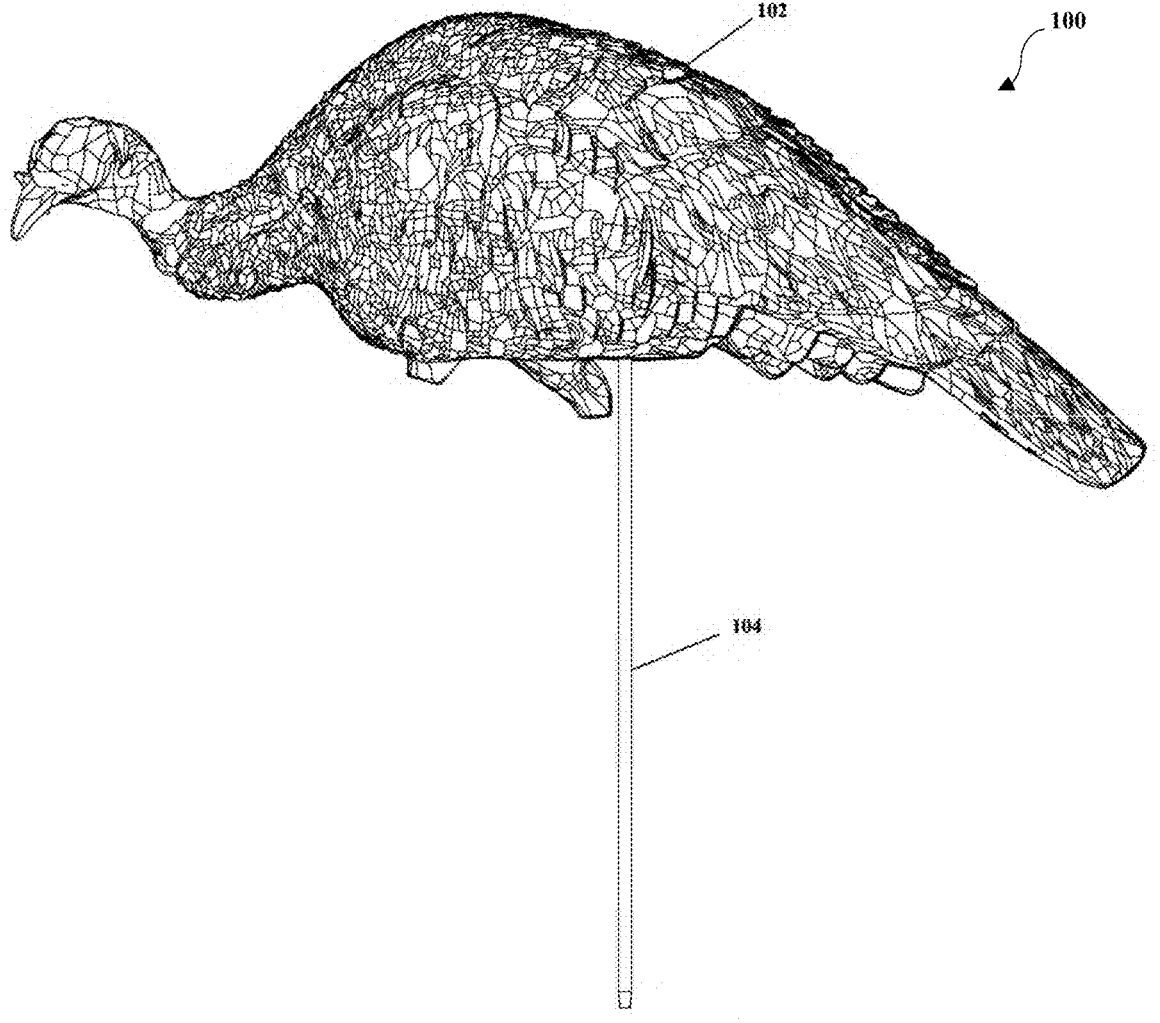
FIG. 1 shows a left-side view of an embodiment of a reconfigurable hen turkey decoy 100 in an upright pose.

The reconfigurable hen turkey decoys can provide a shape, size, detail, and color of an anatomically correct presentation of a hen turkey in one or more different natural poses. For example, the hen turkey decoy can be configured to include an upright pose, a feeding pose, and/or a breeding pose. In the upright or feeding pose, the hen turkey decoy may be positioned about six inches to about twelve inches above the ground surface, representing a standing hen turkey. In the breeding pose, the hen turkey decoy is positioned near or on the ground, representing a hen laying on the ground.

In one or more embodiments, the reconfigurable hen turkey decoy can include, but are not limited to: one or more housings, one or more pivot plates, one or more joints, one or more support members or stakes, one or more guide members, one or more snap-fits, one or more outer surfaces, one or more inner surfaces, one or more interior spaces, one or more recesses, one or more clips, one or more receiving members, one or more ball tips, one or more sockets, one or more ring members, one or more receptacles, one or more openings, one or more rims, and one or more rivets, and one or more screws. The one or more embodiments, the hen turkey decoys can include a length, height, width, front side, back side, right side, left side, top side, bottom side, outer surface, inner surface, and interior space. The components of the hen turkey decoy can be made by various manufacturing techniques. For example, the manufacturing techniques for components of the hen turkey decoy can include, but are not limited to blow molding, extrusion molding, injection molding, roto molding, and combinations thereof. The one or more components of the reconfigurable hen turkey decoy can be coupled to and/or integrally formed with any other of the one or more components.

The reconfigurable hen turkey decoy and any of its components can be made from one or more suitable materials. For example, the one or more components of the reconfigurable hen turkey decoy can made from any one or more metals (such as aluminum, steel, stainless steel, brass, nickel), metal alloys, concretes, fiberglass, wood, composite materials (such as ceramics, wood/polymer blends, cloth/polymer blends, etc.), and plastics (such as polyethylene, polypropylene, polystyrene, polyurethane, polyethylethylketone (PEEK), polytetrafluoroethylene (PTFE), polyamide resins (such as nylon 6 (N6), nylon 66 (N66)), polyester resins (such as polybutylene terephthalate (PBT), polyethylene terephthalate (PET), polyethylene isophthalate (PEI), PET/PEI copolymer) polynitrile resins (such as polyacrylonitrile (PAN), polymethacrylonitrile, acrylonitrile-styrene copolymers (AS), methacrylonitrile-styrene copolymers, methacrylonitrile-styrene-butadiene copolymers; and acrylonitrile-butadiene-styrene (ABS)), polymethacrylate resins (such as polymethyl methacrylate and polyethylacrylate), cellulose resins (such as cellulose acetate and cellulose acetate butyrate); polyimide resins (such as aromatic polyimides), polycarbonates (PC), elastomers (such as ethylene-propylene rubber (EPR), ethylene propylene-diene monomer rubber (EPDM), styrenic block copolymers (SBC), polyisobutylene (PIB), butyl rubber, neoprene rubber, halobutyl rubber and the like)), and mixtures, blends, or copolymers of any and all of the foregoing materials. In some embodiments, any of the components of the reconfigurable hen turkey decoy can include an elastic material that can provide an elastic force. In some embodiments, the elastic material includes an polymers, cross-lined polymers, amorphous cross-lined polymers, and mixtures thereof.

Figure 2:
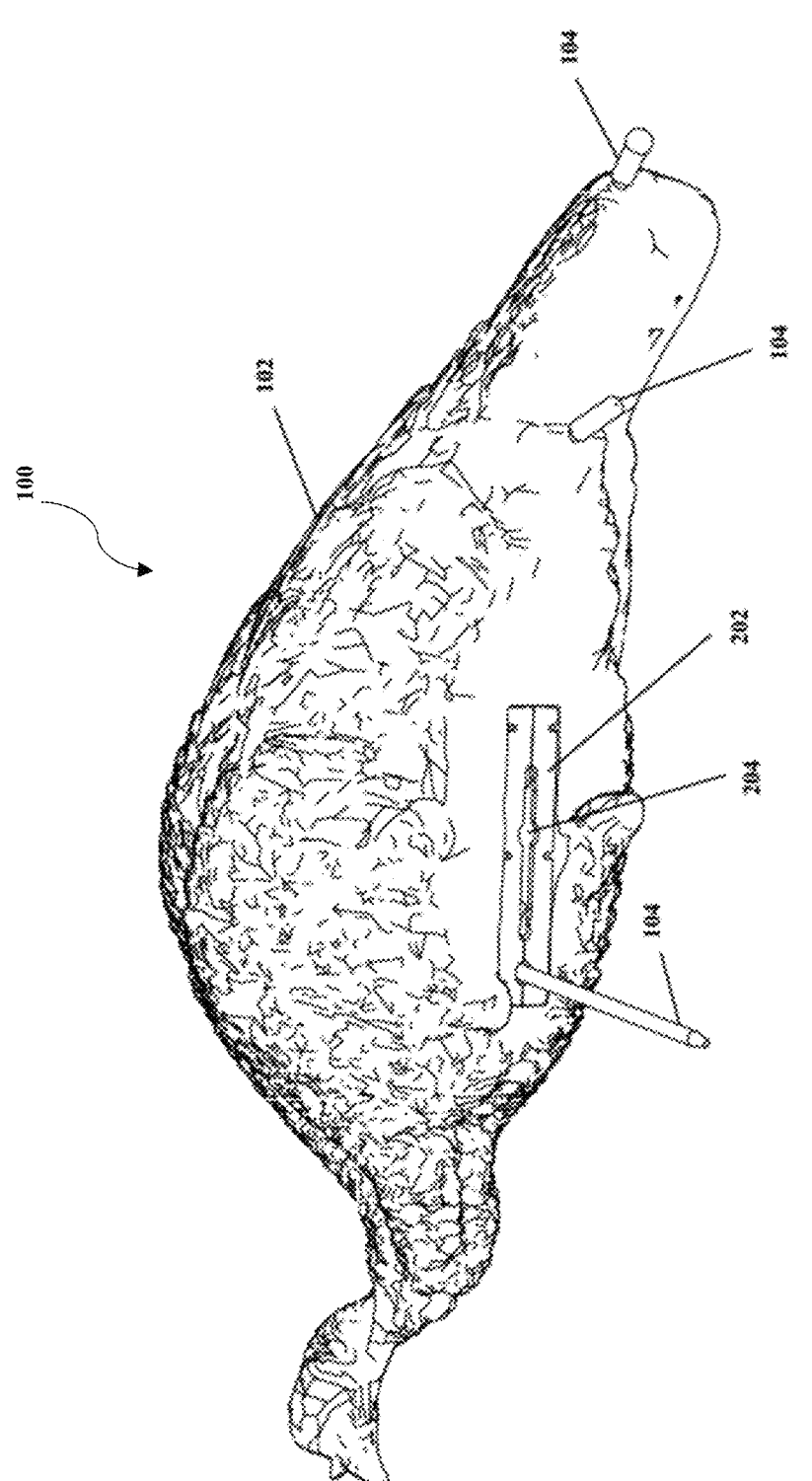
FIG. 2 shows a bottom-side view of an embodiment of a reconfigurable hen turkey decoy 100, including depicting the guide member 202.
Figure 3:
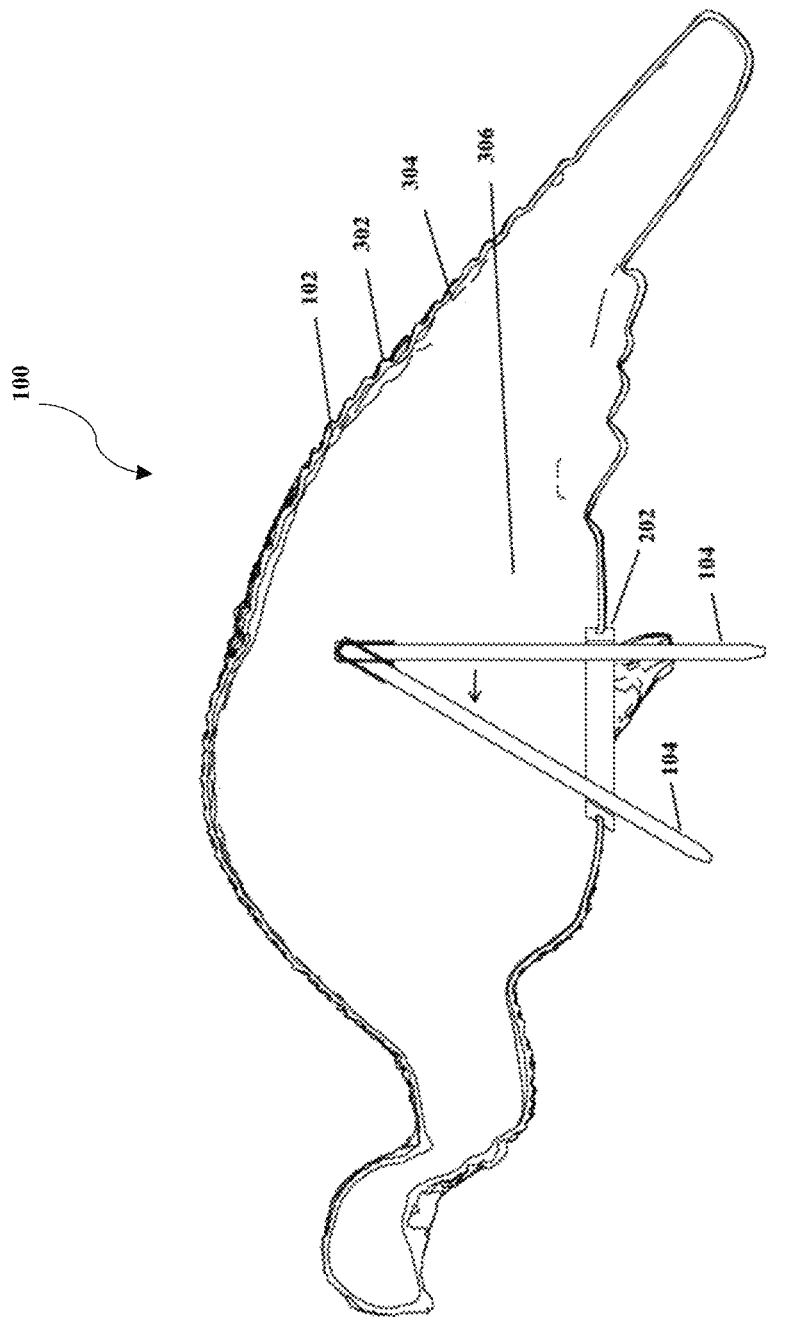
FIG. 3 shows a bisected side view of an embodiment of a reconfigurable hen turkey decoy 100, including depicting the movement of the support member or stake 104.
Figure 4:
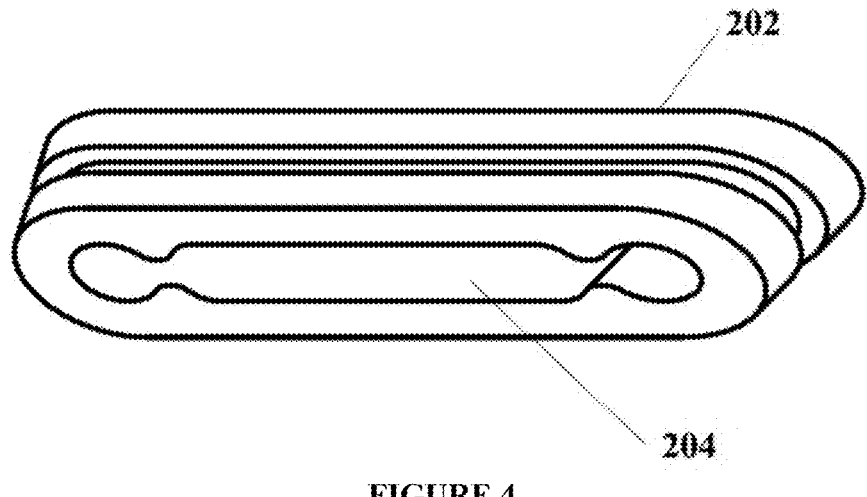
FIG. 4 shows a perspective view of an embodiment of a guide member 202 for a reconfigurable hen turkey decoy 100.
Figure 5:
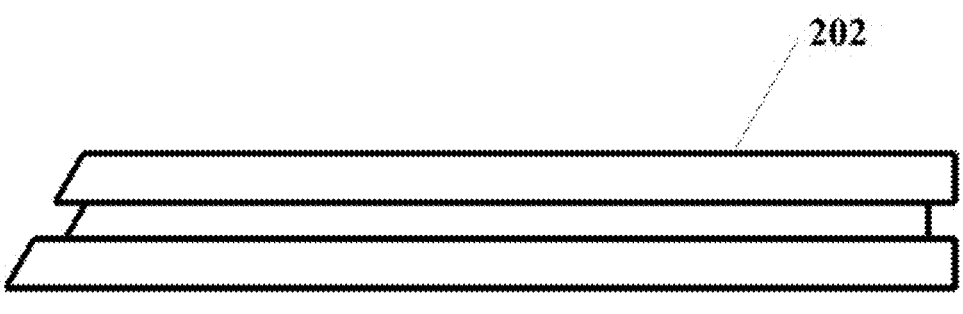
FIG. 5 shows a side view of an embodiment of a guide member 202 for a reconfigurable hen turkey decoy 100.
Figure 6:
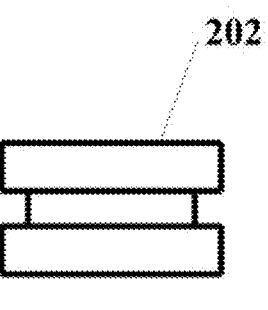
FIG. 6 shows a front side view of an embodiment of a guide member 202 for a reconfigurable hen turkey decoy 100.

FIG. 1 depicts a side view of an embodiment of a reconfigurable hen turkey decoy 100 in an upright pose. In FIG. 1, the reconfigurable hen turkey decoy 100 includes a housing 102 and support member or stake 104. FIG. 2 depicts a bottom-side view of an embodiment of a reconfigurable hen turkey decoy 100, including showing the guide member 202. FIG. 3 shows a bisected side view of an embodiment of a reconfigurable hen turkey decoy 100. As shown FIGS. 1-3, the outer surface 302 of the one or more housings 102 can include, at least partially, the actual shape, size, details, and colors of a mature hen turkey. The outer surface can be molded plastic and painted to look like a hen turkey. For example, the outer surface 304 of the reconfigurable hen turkey decoy 100 can include a head section or an anterior section, a body section, and a tail section or a posterior section. The head section can include the anterior shape of a bird. The head section can include a head, crown, bill, nape, back, neck, throat, wings, chest, and abdomen. The tail section can include the posterior shape of a bird. The tail section can include a tail, undertail covert, rump, legs, wing, flank, and back. The body section can include a mid-shape of a bird. The body section can include nape, back, neck, throat, wings, chest, abdomen, tail, undertail covert, rump, legs, wing, flank. The head section can include a front side, back side, right side, left side, top side, and bottom side. The tail section can include a front, a back, a top, a bottom, a right side, and a left side. A first opening can include, but is not limited to: a rectangular opening positioned at the bottom side of the housing 102. The rectangular first opening can be molded into the bottom side of the housing 102 and the pivot plate 110 can be inserted from the bottom.

The one or more housings 102 can include, but are not limited to: a first housing, a second housing, a third housing, a fourth housing, a fifth housing, a six housing, and more housings. The housing 102 can include a wide variety of shapes. For example, the housing 102 can include, but is not limited to: a cylindrical shape, a cone shape, spherical shape, parallelepiped shape, combinations thereof. The housing 102 can include: a length, height, width, radius, first end, front side, second end, back side, right side, left side, top side, bottom side, outer surface, inner surface, and interior space. The housing 102 can be made by blow molding, extrusion molding, injection molding, roto molding, and combinations thereof.

In some embodiments, the housing 102 can include, but are not limited to: a first housing and a second housing. The first housing and the second housing can include a front side, back side, right side, a left side, a top side, and a bottom side. The first housing and the second housing can be positioned and/or fastened together to form an outer surface and an interior space. For example, the first housing can include a right side of the figure of the hen turkey decoy and the second housing can include a left side of the of the figure of the hen turkey decoy, where the right side of the first housing and the left side of the second housing when positioned together form the outer surface hen turkey decoy. Moreover, the first housing can include the left side and the second housing can include the left side, where the left side of the first housing and the right side of the second housing when positioned together form the interior space of the hen turkey decoy.

In some embodiments, the housings 102 can enclose: the pivot plates, joints, clips, snap-fits, inner surfaces, interior spaces, receiving members, receiving structures, one or more sockets, ring members, receptacles, one or more rivets, and one or more screws. In some embodiments, the pivot plates, joints, snap-fits, clips, receiving member, sockets, ring members, receptacles, can be coupled to and/or integrally formed with the one or more housings. In some embodiments, the housing 102 can include a recess on the interior wall of the conical housing that can engage with the support member or stake 104. In use, the support member or stake 104 can be move between different desired configurations by engaging the guide member 202.

The housing 102 can include one or more openings. For example, the housing 102 can include: a first opening, a second opening, a third opening, a fourth opening, a fifth opening, a six opening, and more openings. In some embodiments, a first opening can include, but are not limited to: a rectangular opening positioned at the bottom side of the housing 102. In some embodiments, the first opening can be positioned at the abdomen of the reconfigurable turkey hen decoy 100. In some embodiments, the housing 102 can include a second opening on its bottom side, allowing the insertion and the storage of a long support member or stake inserted and stored. In some embodiments, a second opening can include, but is not limited to, an ovular or circular opening at the bottom side of the housing 102. For example, the second opening can be positioned at the abdomen and/or the rump of the turkey hen decoy 100. The second opening in the housing 102 can provide a receptacle to accommodate the support member or stake 104. In some embodiments, the housing 102 can include a third opening on its bottom side, allowing the insertion and the storage a short support member or stake inserted and stored. The housing 102 can include an interior space 306 and/or a receptacle to allow the support stakes 104 to be stored inside the housing 102 when not in use and to provide easy retrieval when needed. In some embodiments, the housing 102 can include a first receptacle on its bottom side, allowing the insertion and the storage a long support member or stake inserted and stored. In an embodiment, the housing 102 can include a second receptacle on its bottom side, allowing the insertion and the storage a short support member or stake 104 inserted and stored.

Referring to FIG. 2, an opening can include, but is not limited to an ovular or circular opening at the back side or the bottom side of the housing 102. For example, an opening can be located at the rump and/or the tail feathers of the turkey hen decoy 100. An opening in the housing 102 can allow a support member or stake to be inserted and stored. In some embodiments, a second and/or shorter support member or stake 104 can be inserted into an interior space 306 and/or a receptacle to store the second support member or stake 104 inside the housing 102 when not in use and to provide easy retrieval when needed accommodate.

The one or more support members or stakes 104 can include, but are not limited to: a first support member or stake, a second support member or stake, a third support member or stake, a fourth support member or stake, a fifth support member or stake, a six support member or stake, and more support member or stake. The support member or stake 104 can include a wide variety of shapes. For example, the support member or stake 104 can include, but is not limited to: a cylindrical shape, a cone shape, spherical shape, parallelepiped shape, combinations thereof. The support member or stake 104 can include: a length, height, width, radius, first end, front side, second end, back side, right side, left side, top side, bottom side, outer surface, inner surface, and interior space. In an embodiment, the one or more support members or stakes 104 can include a ball tip at the first end. The ball tip can include a radius and a diameter. In an embodiment, the one or more support members or stakes 104 can include a point at the second end. In an embodiment, the one or more support members or stakes 104 can include cylindrical shape with a radius, diameter, and length. The radius of the support members or stake 104 can be from a short of about 0.01 inches, about 0.1 inches, or about 0.5 inches, to a long of about 1 inch, about 1.5 inches, or about 2 inches. For example, the radius of the support member or stake 104 can be from about 0.01 inches to about 2 inches, about 0.1 inches to about 1 inch, about 0.2 inches to about 0.6 inches, or about 0.5 inches to about 0.075 inches. The length of the support member or stake 104 can be from a short of about 4 inches, about 6 inches, or about 8 inches, to a long of 12 inches, 18 inches, or 30 inches. For example, the length of the support member or stake 104 can be from about 4 inches to about 30 inches, about 6 inches to about 12 inches, about 8 inches to about 12 inches, or about 5 inches to about 18 inches. The one or more support members or stakes 104 can include, but are not limited to: one, two or three support members or stakes. The one or more support members or stakes 104 can include different radii and lengths. The one or more support members or stakes 104 can include, but are not limited to: carbon, wood, plastic, metal, aluminum, metal alloys, and combinations thereof.

In some embodiments, two support members or stakes 104: each can be inserted into the joint 704 and/or the receiving member 706 and/or receiving structure 710 and the other end that can be inserted into the ground to support the decoy in a perpendicular orientation to the ground surface. In some embodiments, the hen turkey decoy 100 can be absent receiving structure 710. In some embodiments, a longer support member or stake 104 can allow the hen turkey decoy to be deployed above the ground as a standing hen turkey, in either the upright or the feeding poses. In some embodiments, a second and shorter support member or stake 104 can allow the hen turkey decoy 100 to be positioned on or near the ground surface as in the breeding pose.

When a support member or stake 104 is inserted into the joint 704 and/or the receiving member 706, the housing 102 and the support member or stake 104 can include an angle of rotation that can vary widely. For example, when the support member or stake 104 is inserted into the joint 704 and/or the receiving member, the housing and the support member or stake can include an angle of rotation that can be from a small of about 0°, about 5°, or about 10°, to a large of about 90°, about 180°, or about 360°. In another example, when the support member is inserted into the joint 704 and/or the receiving member, the housing and the first support member or stake can include an angle of rotation that can be from about 0° to about 360°, about 0.1° to about 359.9°, about 0° to about 60°, about 0° to about 33°, about 0.1° to about 25°, about 0.1° to about 33°, about 0.1° to about 40°, about 0.1° to about 50°, about 0.1° to about 60°, about 0.1° to about 89.9°, about 1° to about 45°, about 0° to about 359.9°, about 0.1° to about 359.9°, about 25° to about 80°, about 33° to about 60°, about 45° to about 80°, about 60° to about 80°, about 75° to about 85°, about 90° to about 91°, about 89° to about 91°, about 50° to about 80°, about 85° to about 95°, about 170° to about 181°, about 179° to about 181°, about 175° to about 185°, about 180° to about 181°, or about 179° to about 180°. In another example, when the support member is inserted into the joint 704 and/or the receiving member, the housing and the support member or stake can include an angle of rotation where an angle of from about 89° to about 91°, about 75° to about 95°, about 90° to about 92°, about 85° to about 95°, or about 88° to about 90° can position the turkey hen decoy into the upright pose. In another example, when the support member is inserted into the joint 704 and/or the receiving member, the housing and the first support member or stake can include an angle of rotation where an angle of about 33° to about 60°, about 45° to about 80°, about 60° to about 80°, about 75° to about 85°, about 90° to about 91°, about 89° to about 91°, or about 50° to about 80° can position the reconfigurable hen turkey decoy 100 into the feeding pose.

In FIGS. 2-6, the reconfigurable hen turkey decoy 100 includes guide member 202. The one or more guide members 202 can include, but are not limited to: a first guide member, a second guide member, a third guide member, a fourth guide member, a fifth guide member, a six guide member, and more guide members. The guide member 202 can include a wide variety of shapes. For example, the guide member 202 can include, but is not limited to: a cylindrical shape, a cone shape, spherical shape, parallelepiped shape, combinations thereof. The guide member 202 can include, but are not limited to: a length, height, width, radius, first end, front side, second end, back side, right side, left side, top side, bottom side, outer surface, inner surface, and interior space. The guide member 202 can include one or more openings. For example, the guide member 202 can include: a first opening, a second opening, a third opening, a fourth opening, a fifth opening, a six opening, and more openings. In some embodiments, the guide member 202 can include an elastic material that can provide an elastic force. In some embodiments, the elastic material includes an polymers, cross-lined polymers, amorphous cross-lined polymers, and mixtures thereof. In some embodiments, the guide member 202 can releasable secure the support member or stake 104. In some embodiments, at least a portion of the guide member may define a resting state shape and comprise a flexible but resilient material, which is capable of being manipulated to deform the at least a portion of the guide member temporarily out of the resting state shape and to return to its resting state shape when no longer acted upon. In such an embodiment, the flex may allow the support member of stake 104 to move about the guide member into various positions, then secure the support member or stake 704 when the guide member component is allowed to return to its resting state.

In some embodiments, the guide member 202 can be inserted over an opening disposed on the bottom side of the housing 102. In some embodiments, the guide member 202 can be coupled to in a substantially flat portion of the inner surface 302 and/or the outer surface of the housing 102. In some embodiments, a guide member 202 may be molded into the decoy body itself. In other embodiments, a guide member 202 can be inserted into the housing 102 through an opening on the housing 102. In such an embodiment, the guide member 202 can plug the opening in the housing. In other embodiments, the guide member can be positioned substantially flush with the exterior of the decoy body when the housing 102 is inserted into the reconfigurable hen turkey decoy 100.

In some embodiments, a guide member 202 can include, but is not limited to, an opening that is slightly wider than the diameter of the long support stake 104. The opening can be positioned longitudinal and/or along the length of the housing. In an embodiment, the opening of the guide member can include at one or more openings. For example, a front opening and a rear opening, and a slot. In this embodiment, the front opening is offset at an angle, while the rear opening is substantially orthogonal to the guide member 202. As depicted, the front opening, rear opening, and slot define one opening separated into sections. In other embodiments, the combination of the openings may define one, two, or three openings. Each of the openings can be diametrically larger than the diameter of both the long and shorter support stakes 104.

Referring to FIG. 3, the reconfigurable hen turkey decoy 100 includes an inner surface 302, an outer surface 304, an interior space 306, one or more openings, a pivot plates 702, a joint 704, a support member or stake 104, first clip 708A, a second clip 708B, receiving members 706, and receiving structures 710. The support member or stake 104 of the reconfigurable hen turkey decoy 100 can move along one or more openings 204 or slot of the guide member 202, placing the reconfigurable hen turkey decoy 100 in a upright position and/or feeding position, as shown in FIG. 3. In some embodiments, an opening 204 of the guide member 202 can include one or more recesses along a perimeter of the opening 204, which can receive the support member or stake 104 so it can be inserted into the interior space 306 of the reconfigurable hen turkey decoy 100. In some embodiments, the opening 204 of the guide member 202 can include a flexible and/or elastic material that can releasably lock and/or secure the support member or stake 104 in multiple configurations, such as the upright pose and/or the feeding pose, by expanding and pressing against the sides of the support member or stake 104.

The one or more pivot plates 702 can include, but are not limited to: a first pivot plate, a second pivot plate, a third pivot plate, a fourth pivot plate, a fifth pivot plate, a six pivot plate, and more pivot plate. In some embodiments, the reconfigurable hen turkey decoy 100 can be absent a pivot plate 702. The pivot plate 702 can include a wide variety of shapes. For example, the pivot plates 702 can include, but is not limited to: a cylindrical shape, triangular shape, cone shape, spherical shape, parallelepiped shape, combinations thereof. The joint 704 can include, but are not limited to: a length, height, width, radius, first end, front side, second end, back side, right side, left side, top side, bottom side, outer surface, inner surface, and interior space. The joint 704 can include one or more openings. For example, the joint 704 can include: a first opening, a second opening, a third opening, a fourth opening, a fifth opening, a six opening, and more openings.

The pivot plates 702 can include, but are not limited to: one or more joints 704, one or more receiving members 706, one or more receiving structures 710, one or more rims, one or more clips which may include a first clip 708A and a second clip 708B, one or more openings, one or more snap fits, one or more rivets, one or more screw holes, inner surface, and outer surface. The one or more receiving members 706, one or more clips which may include a first clip 708A and a second clip 708B, one or more rivets, one or more openings, one or more one or more snap fits, one or more rivets, one or more screw holes of the pivot plate 702 can be coupled to and/or integrally formed with the pivot plate. In some embodiments, the pivot plate 702 can include a triangular shape when viewed from the right side or the left side. For example, the triangular pivot plates 702 can include a first vertex 702A, a second vertex 702B, and a third vertex 702C; a first angle, a second angle, and a third angle; and a first side, second side, and third side. In an embodiment, a triangular shape pivot plate 702 can include a first opening positioned at the top side near a first vertex 702A, a first clip 708A and/or a second opening and/or first receiving structure 706 at the front side near the second vertex 702B, and a second clip 708B at the back side near the third vertex 702C.

Figure 7:
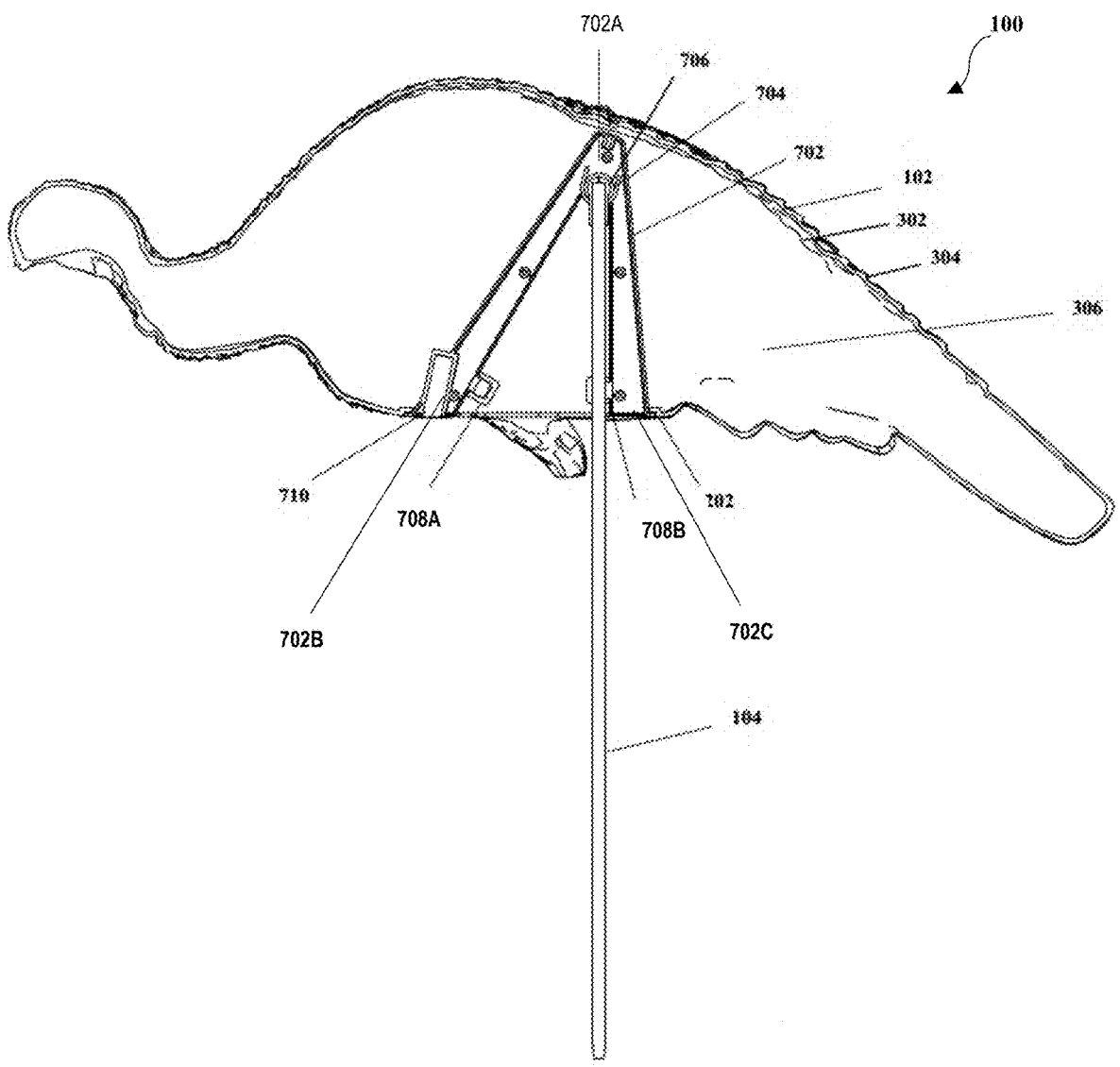
FIG. 7 shows a bisected side view of an embodiment of a reconfigurable hen turkey decoy 100, including depicting an embodiment of a pivot plate 702 with a support member 104 engaged.
Figure 8:
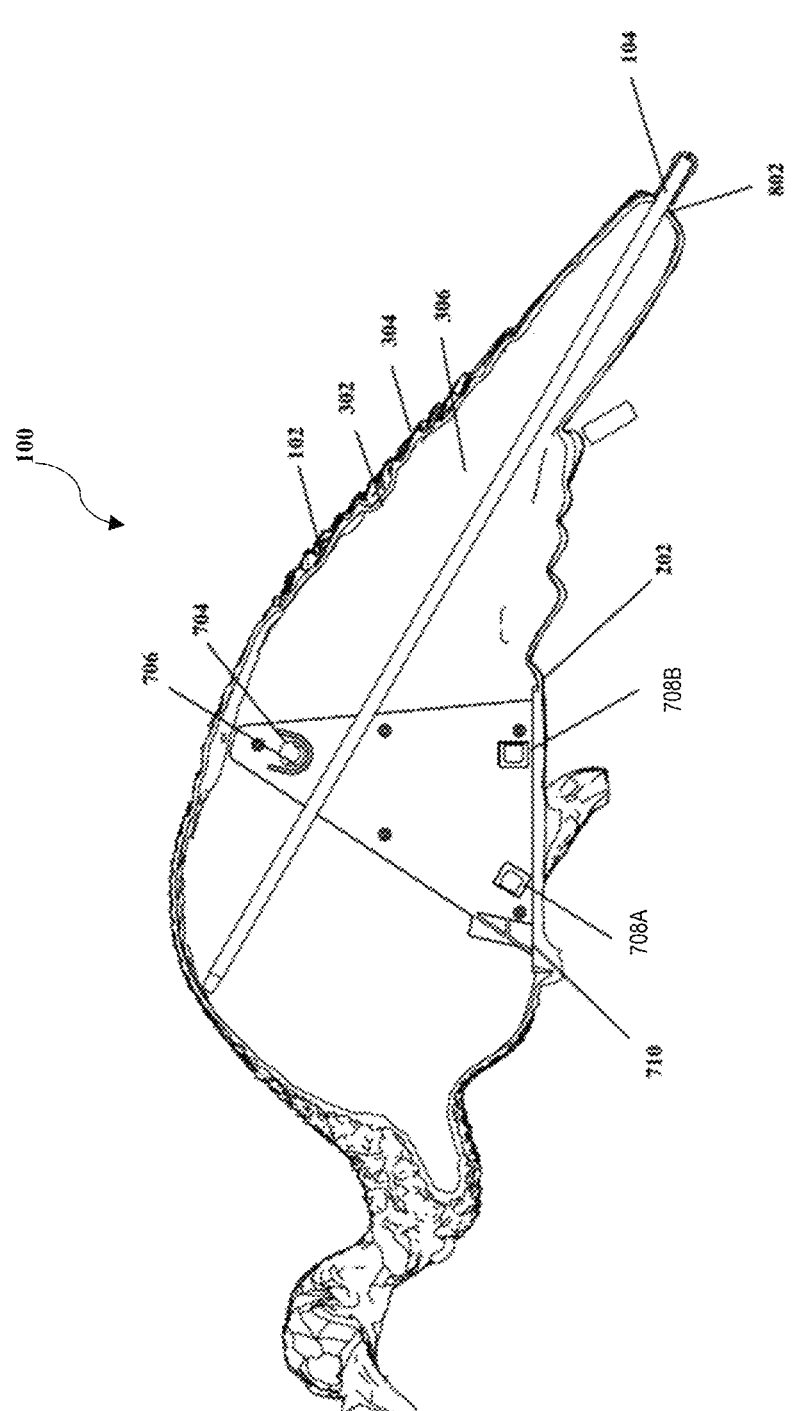
FIG. 8 shows a bisected side view of an embodiment of a reconfigurable hen turkey decoy 100, including depicting with a support member 104 stored in an interior space 306 of a housing.
Figure 9:
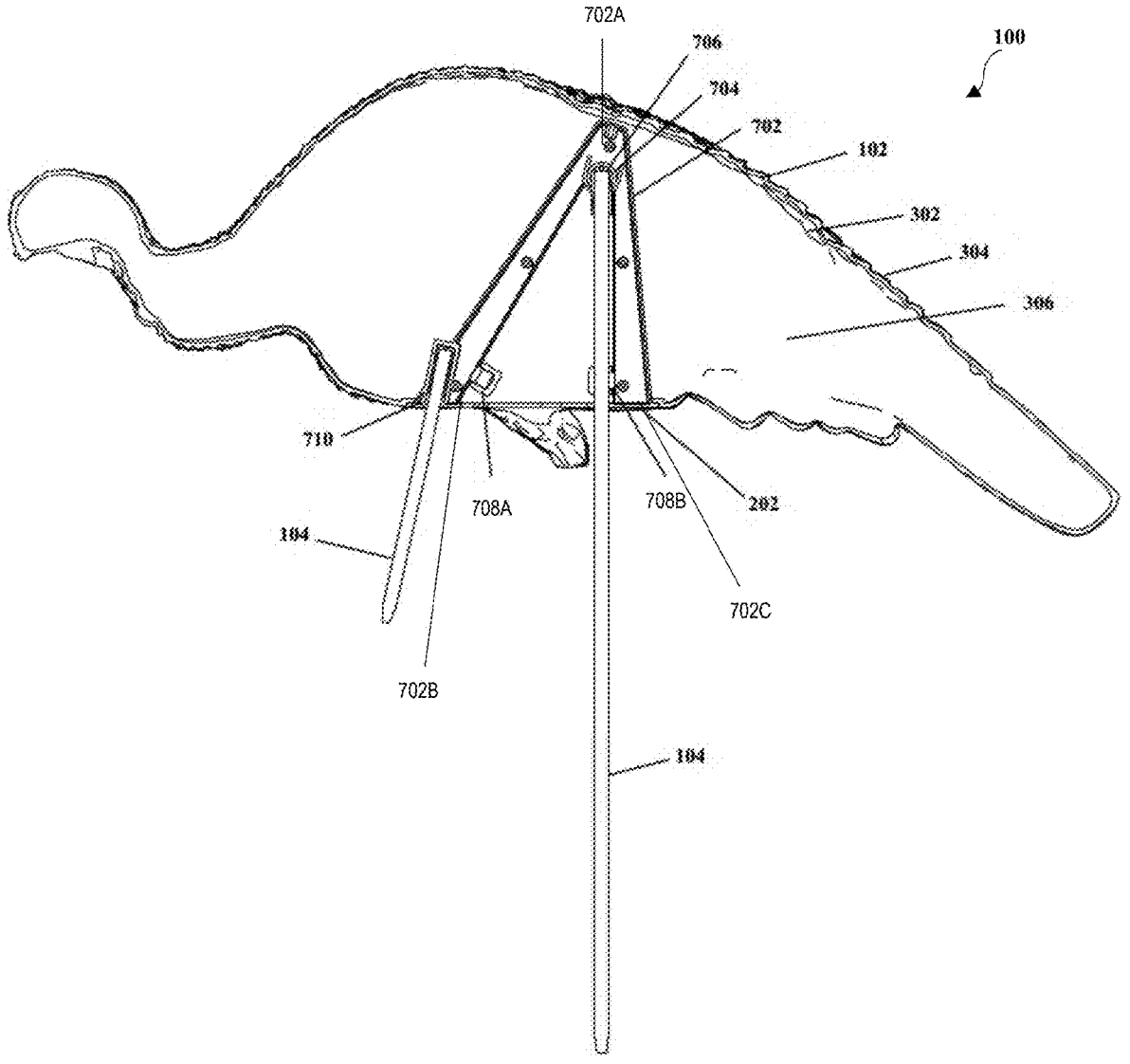
FIG. 9 shows a bisected side view of an embodiment of a reconfigurable hen turkey decoy 100, including depicting an embodiment of a pivot plate 702 engaging a first support member or stake 104 and second support member or stake 104.
Figure 10:
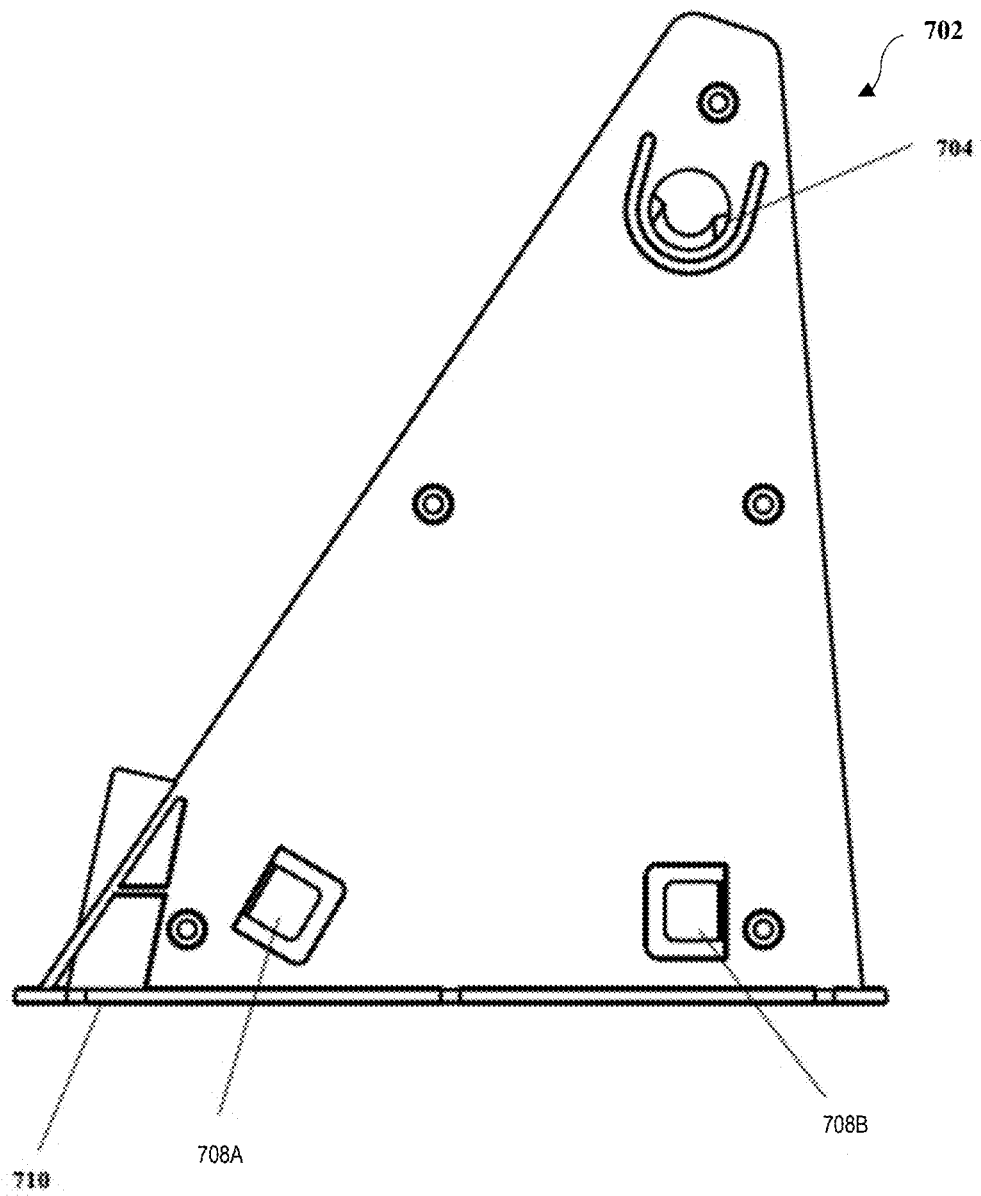
FIG. 10 shows an embodiment of a pivot plate 702 for a reconfigurable hen turkey decoy 100.

FIGS. 7-9 depicts a bisected side view of an embodiment of a reconfigurable hen turkey decoy 100, including showing how a support member or stake 104 can engage a pivot plate 702 or be stored in the interior space 306 of the housing 102. Referring to FIGS. 7-9, the one or more pivot plates 702 can be positioned or inserted into the interior space 306 of the housing 102. In an embodiment, the pivot plates 702 can be inserted through a first opening in the housing 102. The inner surface 302 of the housing 102 can include a flat area of its inner surface 302 and the pivot plate 702 can be inserted from a bottom side first opening and coupled to the inner surface 302. The pivot plates 702 can be molded to receive the one or more support members or stakes 104. For example, the pivot plate 702 can receive a first support member 104 and a second support member 104. The pivot plate 702 and the first support member 104 and a second support member 104 can provide the reconfigurable hen turkey decoy with the three configurations or poses.

In some embodiments, the pivot plates 702 can allow a long support member or stake 104 to be inserted from the bottom of the housing 102. The hen turkey decoy 100 and/or housing 102 can be rotated around a joint 704 or a socket in either of the upright pose or feeding pose. In some embodiments, the first clip 708A and the second clip 708B at the second vertex 702B and third vertex 702C, respectively, of the triangular-shaped pivot plate 702 can engage or lock a support member or stake 104 in the upright pose or the feeding pose. In an embodiment, the first clip 708A and the second clip 708B at the second vertex 702B and third vertex 702C, respectively, of the triangular-shaped pivot plate 702 can disengage or release the support member or stake 104, allowing the housing and the support member or stake 104 to rotate with respect to each other. In other embodiments, a joint 704 can receive an end of the support member or stake 104 into its receiving member 706 and/or receiving structures 710. In some embodiments, the pivot plate 702 can be absent of a first clip 708A, a second clip 708B, or of any clips.

The one or more joints 704 can include, but are not limited to: a first joint, a second joint, a third joint, a fourth joint, a fifth joint, a six joint, and more joint. The joint 704 can include a wide variety of shapes. For example, the joint 704 can include, but is not limited to: a cylindrical shape, a cone shape, spherical shape, parallelepiped shape, combinations thereof. The joint 704 can include, but are not limited to: a length, height, width, radius, first end, front side, second end, back side, right side, left side, top side, bottom side, outer surface, inner surface, and interior space. The joint 704 can include one or more openings. For example, the joint 704 can include: a first opening, a second opening, a third opening, a fourth opening, a fifth opening, a six opening, and more openings.

The joint 704 can include, but are not limited to: one or more ring members, one or more ball and socket joints, one or more revolute joints, one or more pin joints, one or more hinge joints, one or more receiving structures, one or more receiving members, and one or more openings. The one or more ring members, one or more ball and socket joints, one or more revolute joints, one or more pin joints, one or more hinge joints, one or more receiving structures, and one or more openings can be coupled to and/or integrally formed with the one or more joints. In an embodiment, the pivot plates 702 can have the one or more joints 704 disposed thereon. For example, the joints 704 can be coupled to and/or integrally formed with the pivot plates.

When a support member or stake 104 is inserted into the receiving structure 706 of the pivot plate, the housing and the support member or stake 104 can include an angle of rotation that can vary widely. For example, when a support member or stake 104 is inserted into the receiving structure 706 of the pivot plate 702, the housing 102 and the second support member or stake 104 can include an angle of rotation that can be from a small of about 0°, about 5°, or about 10°, to a large of about 90°, about 180°, or about 360°. In another example, when a support member or stake 104 is inserted into the receiving structure 706 of the pivot plate 702, the housing 102 and the second support member or stake 104 can include an angle of rotation that can be from about 0° to about 360°, about 0.1° to about 359.9°, about 0° to about 60°, about 0° to about 33°, about 0.1° to about 25°, about 0.1° to about 33°, about 0.1° to about 40°, about 0.1° to about 50°, about 0.1° to about 60°, about 0.1° to about 89.9°, about 1° to about 45°, about 0° to about 359.9°, about 0.1° to about 359.9°, about 33° to about 60°, about 42° to about 48°, about 45° to about 80°, about 60° to about 80°, about 75° to about 85°, about 90° to about 91°, about 89° to about 91°, about 25° to about 80°, about 50° to about 80°, about 85° to about 95,° about 170° to about 181°, about 179° to about 181°, about 175° to about 185°, about 180° to about 181°, or about 179° to about 180°. In another example, when a support member or stake 104 is inserted into the receiving structure 706 of the pivot plate 702, the housing 102 and the second support member or stake 104 can include an angle of rotation from about 89° to about 91°, about 75° to about 95°, about 90° to about 92°, about 85° to about 95°, or about 88° to about 90° can position the reconfigurable turkey hen decoy 100 into the breeding pose.

Referring to FIGS. 7-9, a first end of the support member or stake 104 can be positioned into an opening of the joint 704 and/or an opening of the receiving member 706 of the pivot plate 110. In an embodiment, a second end of the support member or stake 104 can be inserted into the ground surface to support the hen turkey decoy 100. In an embodiment, a first and a longer support member 104 can be inserted and/or coupled to the pivot plate 110 to allow the turkey hen decoy 100 to be deployed above the ground surface with the housing 102 substantially parallel to the ground surface and/or with the head of the turkey hen decoy 100 in an upright pose. The first and the longer support member or stake 104 can be inserted and/or coupled to the pivot plate 702 to allow the turkey hen decoy 100 to be deployed above the ground surface with the front side of the housing 102 titled toward the ground and/or with the head of the turkey hen decoy 100 tilted toward the ground in a feeding position. In an embodiment, the pivot plate 702 with a first and a longer support member 110 can be rotated or pivoted along an axis of the pivot plate 702 to position the turkey hen decoy 100 in either a standing position or a feeding position. The one or more clips 706 of the pivot plate 110 can temporarily lock or secure the turkey hen decoy 100 in the upright pose, feeding pose, and breeding pose, preventing the pivot plate 702 from rotating from the prevailing ambient wind conditions. In an embodiment, a second shorter support member or stake 104 can be inserted and/or coupled to the pivot plate 702 to allow the turkey hen decoy 100 to be deployed at or slightly above the ground surface to represent a breeding position. In an embodiment, a second shorter support member or stake 104 can be inserted into a receiving structure 120 of the pivot plate 702 to allow the turkey hen decoy 100 to be deployed at or slightly above the ground surface to represent a breeding pose or lying pose.

In some embodiments, a long support member or stake 104 and a shorter support member or stake 104 each with two ends, a first end can be positioned inside the housing 102 of the reconfigurable hen turkey decoy 100, and a bottom end opposite the top end. In such an embodiment, the long support member or stake 104 and shorter support member or stake 104 can be coupled to each other at or near the first ends of the support stakes. In some embodiments, the support member or stake 104 can be mechanically connected in a manner such that the second ends can be turned or pivoted closer to each other such that a substantial portion of the support stakes can be inserted with the first end into the slot. Then, when external force ceases to be exerted on the support member or stake 104, the connection can push the second ends of the support member or stake 104 away from each other. In other embodiments, the shorter support member or stake 104 can be inserted into a first opening on the housing 102 and the long support member or stake 104 into a second opening on the housing 102 during operation.

In some embodiments, a support member or stake 104 can include a ball tip of a diameter larger than the diameter of the long support member or stake, mounted on a first end of the support member or stake 104. In an embodiment, the pivot plate 702 can include a triangular shape when viewed from the side and can be installed into the interior space of the housing 102. A rectangular first opening can be molded into the bottom side of the housing and the pivot plate can be inserted from the bottom. A vertex of the triangular-shaped pivot plate 702 can be positioned and/or coupled to the inner surface 302 of the of the top of the hen turkey decoy. For example, the pivot plate can be positioned and/or fastened with screws, rivets, and snap-fits. In another embodiment, a pivot plate 702 can be molded into the bottom of the reconfigurable hen turkey decoy 100. In another embodiment, a guide member can be molded into the bottom of the reconfigurable hen turkey decoy 100.

In some embodiments, a bottom of the pivot plate 702 can include a rim, which can be coupled to and/or integrally formed with the pivot plate. In an embodiment, the rim can be coupled to the outside of a small flat portion of the housing. This flat portion of the pivot plate can include, but is not limited to, an opening that is slightly wider than the diameter of the long support stake. The opening can be positioned longitudinal and/or along the length of the housing. In an embodiment, this longitudinal opening can include ends and/or rigids that can become the location of the upright and feeding positions as the hen turkey decoy is rotated about a ball shaped end of the support member or stake and a joint 704, meaning that as the housing can be rotated about ball shaped end of the support member or stake 104 and a joint 704, it positions the decoy from the upright to the feeding positions. In other embodiments, the rigids may be located along the pivot plate opening instead of the end. The bottom of the pivot plate can include a larger circular opening approximately mid-way between the ends to allow insertion of the ball shaped hub and stake. The pivot plate 702 can include a mating partial ring near the vertex of the triangular shape that can allow the ball shaped end of the support member or stake to be inserted into a ring structure and/or a joint of the pivot plate when the support member or stake is inserted through the center of the larger circular opening. The ring structure and/or a joint of the pivot plate can provide for the housing to rotate about the ball shaped end of the support member or stake between the ends of the longitudinal opening. In an embodiment, disposed on the pivot plate, near the bottom, semi-flexible clips, which clips may include a first clip 708A and/or a second clip 708B, can be provided to engage or lock the support member or stake at either end but allow the support member or stake to disengage or release from the clip with minimal force.

Figure 11:
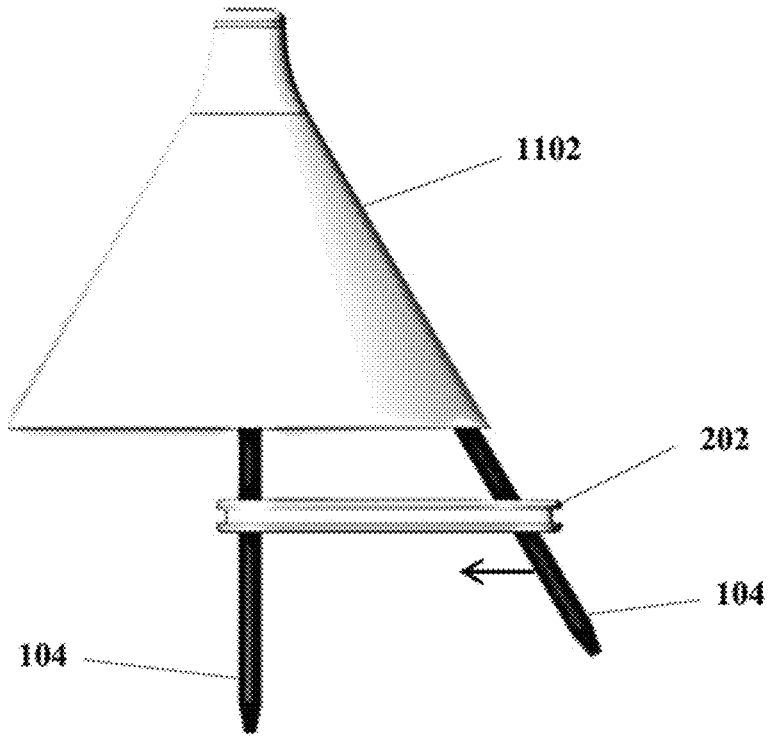
FIG. 11 shows an embodiment of a conical-shaped pivot plate 702 and guide member 202, including depicting the movement of the support member and/or stake 104.

In some embodiments, an embodiment of a reconfigurable turkey hen decoy 100 can include a single support member or stake 104 employed in conjunction with a housing 102, where the support member or stake 104 is capable of being moved between positions to, in turn, fix and/or lock the housing 102 between the desired configurations or poses, as shown in FIG. 3. In some embodiments, the housing 102 can be substantially conical in shape with a vertex or recess in the inner wall of the housing 102, where the support member or stake 104 can be inserted into the housing 102 and positioned such that a first end of the support member or stake 104 can be positioned upwards into the housing. One or more recesses can be disposed on the inner surface 304 of the housing 102 near the top of the housing 102. This recess can include a receiving member 706 absent a pivot plate 702 through which the support stake is connected to the housing unit. The top end of the support member or stake 104 can be coupled or positioned into the recess with the support member or stake 104 extends outwards from the housing 102. In an embodiment, the end opposite is positioned outside the housing 102 in such a manner that the support member or stake 104 extends through an opening in the conical structure and through an opening in the housing 102 and/or hub can act as a hinge and the support stake is capable of being rotated or manipulated about said hinge such that the bottom of the support stake pivots between desired positions. In some embodiments, the housing 102 can include a conical shaped inner surface 302, which can receive support member or stake 104. In some embodiments, the pivot plate can include a conical shape, which can be coupled to the inner surface 302 of the housing 102. FIG. 11 shows a conical shape pivot plate, which can be positioned or coupled to the inner surface 302 of the housing 102. In some embodiments, a mounting backet can be coupled to and/or integrally connected to with the housing 102 to guide the support stake 104 into the desired positions.

A method of using the reconfigurable hen turkey decoy 100 can include positioning the turkey hen decoy into the three most common poses or positions of the hen turkey. The method of using a reconfigurable hen turkey decoy 100 can include, but is not limited to: inserting a first support member 104 into a joint 704; where the joint 704 is connected to a pivot plate 702, where the pivot plate 702 can include, but is not limited to: a first clip 708A, a second clip 708B, a receiving member 706, a triangular-shape, where the triangular shape of the pivot plate has a first vertex 702A, a second vertex 702B, and a third vertex 702C, where the joint is positioned near the first vertex 702A, where the first clip is positioned near the second vertex 702B of the pivot plate 702, where the second clip is positioned near the third vertex 702C of the pivot plate 702, where the receiving member is positioned near the third vertex 702C of the pivot plate, where the pivot plate 702 is coupled to a housing 102; where the housing 102 can include blow molding plastic, an outer surface, an inner surface, an interior space, and a rectangular-shaped opening on a bottom side, where at least a portion of the outer surface 306 of the housing resembles a hen turkey, where the pivot plate 702 is positioned in the interior space of the housing 102 and coupled to the inner surface, and where the housing and the first support member form an angle; rotating the housing 102 and the first support member 104; and locking the first support member 104 into the first clip 708A, where the angle of the housing and the first support member 104 is from about 85° to about 95°. The method of using a reconfigurable hen turkey decoy 100 can also include: rotating the housing 102 and the first support member 104; and locking the first support member or stake 104 into the second clip 708B, where the angle of the housing and the first support member or stake 104 is from about 25° to about 80°. The method of using a reconfigurable hen turkey decoy 100 can also include: inserting a second support member or stake 104 into the receiving member 706, where the second support member or stake 104 is shorter that the first support member or stake 104, and where an angle of the housing 102 and the second support member or stake 104 is from about 85° to about 95°. In an embodiment, when the reconfigurable hen turkey decoy 100 can be rotated orientating its head is near the ground in a feeding pose or it can be rotated to orient its head up in the upright pose. In an embodiment, when centered in a larger circular opening only, the support member or stake 104 can be inserted or removed. In an embodiment, the long support member or stake 104 can be stored in a first receptacle and/or second opening of the housing. When configuring to the breeding position, the short stake can be retrieved from a second receptacle and/or third opening, and inserted into a receiving member 706 of the pivot plate 702 to orientate a hen turkey laying in a breeding pose. The reconfigurable hen turkey decoy 100 can easily and conveniently be configured into the three of most common poses of a hen turkey.

One of ordinary skill in the art will readily appreciate that alternative but functionally equivalent components, materials, designs, and equipment can be used. The inclusion of additional elements can be deemed readily apparent and obvious to one of ordinary skill in the art. Specific elements disclosed herein are not to be interpreted as limiting, but rather as a basis for the claims and as a representative basis for teaching one of ordinary skill in the art to employ the present invention.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Headings and subheadings, if any, are used for convenience only and do not limit the subject technology.

As used herein, the singular forms "a", "an", and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising". As used herein, use of the term "including" as well as other forms, such as "includes," and "included," is not limiting.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

The terms "couples", "coupled", "coupler", and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. It should also be appreciated that the numerical limits can be the values from the examples. Certain lower limits, upper limits and ranges appear in at least one claims below. All numerical values are "about" or "approximately" the indicated value, and consider experimental error and variations that would be expected by a person having ordinary skill in the art.

All patents, patent applications, provisional applications, and publications referred to or cited herein are incorporated by reference in their entirety, including all figures and tables, to the extent they are not inconsistent with the explicit teachings of this specification.

Although the invention has been described with reference to the above examples, it will be understood that modifications and variations are encompassed within the spirit and scope of the invention. Accordingly, the invention is limited only by the following claims.

What is claimed is:

1. A reconfigurable hen turkey decoy comprising:

a housing, wherein the housing comprises blow molded plastic or roto molded plastic, wherein the housing has an outer surface, an inner surface, and an interior space, wherein at least a portion of the outer surface resembles a hen turkey, and wherein the housing has an opening on a bottom side;

a pivot plate; and a joint; wherein the pivot plate comprises injection molded plastic, wherein the pivot plate is positioned in the interior space of the housing and coupled to the inner surface, and wherein the pivot plate is a triangular shape, wherein the triangular shape has a first vertex, a second vertex, and a third vertex, and wherein the joint is coupled to the pivot plate and positioned near the first vertex;

a support member, wherein the support member has a length and a radius, wherein the support member is removably positioned in the opening of the housing, wherein the length of the support member and the length of the housing forms an angle, and wherein the support member and the housing can be releasably secured into at least two different angles;

a receiving structure, wherein the receiving structure is located near the joint of the triangular-shaped pivot plate; and a first clip, wherein the first clip is located near a second vertex of the triangular-shaped pivot plate, wherein the first support member can be temporarily locked into a position with the first clip, wherein the housing and the first support member form an angle, and wherein the angle of the housing and the first support member is from about 85° to about 95°.

2. A reconfigurable hen turkey decoy comprising:

a housing, wherein the housing comprises blow molded plastic or roto molded plastic, wherein the housing has an outer surface, an inner surface, and an interior space, wherein at least a portion of the outer surface resembles a hen turkey, and wherein the housing has an opening on a bottom side;

a pivot plate and; a joint, wherein the pivot plate comprises injection molded plastic, wherein the pivot plate is positioned in the interior space of the housing and coupled to the inner surface, and wherein the pivot plate is a triangular shape, wherein the triangular shape has a first vertex, a second vertex, and a third vertex, and wherein the joint is coupled to the pivot plate and positioned near the first vertex;

a support member, wherein the support member has a length and a radius, wherein the support member is removably positioned in the opening of the housing, wherein the length of the support member and the length of the housing forms an angle, and wherein the support member and the housing can be releasably secured into at least two different angles;

a receiving structure, wherein the receiving structure is located near the joint of the triangular-shaped pivot plate; and a clip, wherein said clip is located near a third vertex of the triangular-shaped pivot plate, wherein the first support member can be releasably locked into a position with the clip, wherein the housing and the first support member form an angle, and wherein the angle of the housing and the first support member is from about 25° to about 80°.

3. The reconfigurable hen turkey decoy of claim 1, wherein the hen turkey decoy is in an upright pose.

4. The reconfigurable hen turkey decoy of claim 2, wherein the hen turkey decoy is in a feeding pose.

5. The reconfigurable hen turkey decoy of claim 1, wherein the housing further comprise an elastic material.

6. The reconfigurable hen turkey decoy of claim 5, wherein the elastic material is one of the following materials: polymers, cross-lined polymers, amorphous cross-lined polymers, and mixtures thereof.

7. The reconfigurable hen turkey decoy of claim 2, wherein the housing further comprise an elastic material.

8. The reconfigurable hen turkey decoy of claim 7, wherein the elastic material is one of the following materials: polymers, cross-lined polymers, amorphous cross-lined polymers, and mixtures thereof.

9. The reconfigurable hen turkey decoy of claim 1, wherein the portion of the outer surface of the housing resembling a hen turkey resembles the actual shape, size, details, and colors of a mature hen turkey.

10. The reconfigurable hen turkey decoy of claim 2, wherein the portion of the outer surface of the housing resembling a hen turkey resembles the actual shape, size, details, and colors of a mature hen turkey.

11. The reconfigurable hen turkey decoy of claim 1, wherein the portion of the outer surface resembling a hen turkey further comprises:

a head section including a head, crown, bill, nape, back, neck, throat, wings, chest, and abdomen;

a tail section resembling the posterior shape of a bird, including a tail, undertail covert, rump, legs, wing, flank, and back; and a body section resembling a mid-shape of a bird, including a nape, back, neck, throat, wings, chest, abdomen, tail, undertail covert, rump, legs, wing, flank.

12. The reconfigurable hen turkey decoy of claim 2, wherein the portion of the outer surface resembling a hen turkey further comprises:

a head section including a head, crown, bill, nape, back, neck, throat, wings, chest, and abdomen;

a tail section resembling the posterior shape of a bird, including a tail, undertail covert, rump, legs, wing, flank, and back; and a body section resembling a mid-shape of a bird, including a nape, back, neck, throat, wings, chest, abdomen, tail, undertail covert, rump, legs, wing, flank.

13. The reconfigurable hen turkey decoy of claim 1, further comprising a second clip, wherein the second clip is located near a third vertex of the triangular-shaped pivot plate, wherein the first support member can be releasable locked into a position with the second clip, wherein the housing and the first support member form an angle, and wherein the angle of the housing and the first support member is from about 25° to about 80° when the first support member is locked into a position with the second clip.

* * * * *